Patented May 31, 1938

2,119,060

UNITED STATES PATENT OFFICE 2,119,060

METHOD OF ENHANCING THE VARIETAL COLORATION OF WHOLE FRUIT

Jagan N. Sharma, Riverside, Calif., assignor to Food Machinery Corporation, San Jose, Calif., a corporation of Delaware No Drawing. Application November 12, 1934, Serial No. 752,699

8 Claims. (Cl. 99—103)

This invention relates to improved methods of enhancing the varietal color of fruit provided with water-repellent and/or oily outer skin, particularly citrus fruit.

It has been pointed out heretofore that attractiveness and coloration of citrus fruits is not an absolute criterion of the juice content, sugar content, degree of maturity, etc. Due to variations in weather conditions during critical periods of growth, or due to cultivation or lack of cultivation during such periods, the fruit may not develop the ideally characteristic varietal color although such fruit has reached maturity and has an entirely acceptable and desirable juice and sugar content. The purchasing public is influenced by the visual appearance of the fruit in purchasing the same. As a result, large quantities of fruit which are entirely satisfactory as to juice and sugar content, are sold at prices below the market price simply because the characteristic varietal color had not been developed to a required extent.

This invention is particularly directed toward a novel method of treating citrus fruit having a satisfactory juice and sugar content, for the purpose of enhancing their varietal color to the end that the fruit may assume their proper position in the markets of the world.

In imparting a desired varietal coloration to fruit provided with oily and/or water-repellent skin, it is desired that the color become an integral part of the skin and permeate the exterior portions of the skin so as to be substantially irremovable therefrom. The use of colloidal solutions of oil-soluble dyes has been disclosed in my co-pending application Serial No. 712,831, filed February 24, 1934, such oil-soluble dyes impregnating the oily, waxy and water-repellent skins of the fruit.

In the prior methods, temperatures above 100° F. were used in the treating bath in order to permit the required action to take place within a commercially feasible and economical time. In accordance with the present invention, however, oil-soluble dyes are not used, thereby permitting smaller volumes of treating agents to be used and concomitantly higher concentrations. The quantity or proportion of oil-soluble dye in the treating bath heretofore used has been relatively small. Moreover, the method of the present invention can be carried out at normal atmospheric temperatures, thereby obviating the necessity of maintaining accurate temperature control during the performance of the process.

Generally stated, the present invention contemplates a method in which the fruit is subjected to sequential contact with two reagents, neither of which is capable of individually imparting a desired coloration to the fruit but which react within the outer layers of the skin or peel with the formation of a desired coloring substance. The reagents may well be dye intermediates having the property of penetrating into the outer skin or peel.

It is an object of this invention, therefore, to disclose and provide a method of imparting an enhanced varietal coloring to fruit provided with water-repellent surfaces.

Another object is to disclose and provide a method of imparting an enhanced varietal coloring to whole fruit provided with water-repellent skins or peels without the use of actual dyes.

Another object is to provide a method of imparting an enhanced varietal coloring to whole fruit without the necessity of using baths or reagents at temperatures above 100° F.

A still further object is to disclose and provide a method of imparting an enhanced varietal color to whole fruit provided with water-repellent skins or peels whereby large quantities of fruit may be treated with relatively small volumes of treating solution.

These and other objects, uses, advantages and adaptations of the invention will become apparent to those skilled in the art from the subsequent description of a preferred manner of performing the method of this invention and of certain modifications thereof.

In carrying out the process of this invention, it is not necessary that the fruit, such as citrus fruit, be first washed although preliminary washing is of advantage in that dirt and other impurities which may otherwise impair the appearance of the fruit, are removed. The washed fruit need not be contacted with an antiseptic or sterilizing or mold-inhibiting agent as the reagents used in accordance with this invention exert a suitable and efficient sterilizing and mold-inhibiting action. The washed fruit may or may not be preliminarily sorted or graded as to color and/or size. Preliminary grading for color is desirable, however, as the entire treating operation may then be carried out with the production of fruit of more uniform final color.

For purposes of illustration, the intermediates may consist of beta naphthol and diazotized xylidine. The first bath containing the beta naphthol may consist of water to which sodium hydroxide has been added. In making up an aqueous solution, the ingredients may be used in the proportion of 5 grams of beta naphthol to 1000 grams of .15% sodium hydroxide solution. Alcohol or other organic solvent may be present in the bath, but in general such solvents are not desirable as they increase the cost and sometimes cause burning of the fruit. The diazotized intermediates or beta naphthylamine may be used in any desired concentration and either diluted with organic solvents or with water. Variation in concentration of intermediates may materially influence the time that the fruit need be maintained in contact therewith to cause the intermediate to penetrate into the peel or skin.

The fruit which it is desired to treat are dipped, sprayed or otherwise brought into contact with the beta naphthol solution, such contact being maintained for a period of from but a few seconds to 1 minute or more. The bath need not be heated and is preferably maintained at normal atmospheric temperatures.

The fruit may then be rinsed with water to remove excess beta naphthol and passed through a second bath of intermediate capable of reaction or coupling with the first intermediate. The intermediates used in performing this process are preferably oil-soluble or soluble in solvents capable of impregnating or penetrating the water-repellent, oily and/or waxy skins or peels of the fruit or such intermediates may consist of an acid salt which, upon solution in water, hydrolyzes to form an oil-soluble intermediate constituent.

The fruit, after first being contacted with the beta naphthol solution and being rinsed, can then be passed into a bath containing diazotized xylidine in which bath they are maintained for a period of from 2 or 3 seconds to a period of about 1 minute. Upon being removed from this secondary bath, it will be found that the fruit are of an enhanced orange color.

After contact with the secondary intermediate, the fruit is preferably washed and scrubbed for the purpose of removing any dye which may have formed directly on the surface of the fruit. The customary steps of drying, waxing and polishing may then be carried out upon the fruit, or the secondary intermediate bath may contain a small quantity of waxy material in solution or suspension.

Various intermediates capable of coupling with the production of colors suitable for the treatment of citrus fruits are available. The beta naphthol mentioned hereinabove may be coupled with diazotized aniline, for example, instead of diazotized xylidine. Other examples include:

Diazotized toluidines coupled with beta naphthol

Diazotized alpha naphthylamine coupled with beta naphthol (C. I. 82)

Diazotized alpha naphthylamine coupled with beta naphthylamine

Diazotized para nitraniline coupled with beta naphthol (C. I. 44)

Diazotized amino azo benzene coupled with mixed beta naphthol and phenol

Diazotized amino azo toluene coupled with mixed beta naphthol and phenol

Diazotized amino azo xylene coupled with mixed beta naphthol and phenol

Diazotized amino azo benzene coupled with beta naphthylamine

Diazotized amino azo toluene coupled with beta naphthylamine

Diazotized amino azo xylene coupled with beta naphthylamine

The precise sequence in which the fruit is subjected to the action of the intermediates referred to hereinabove is not essential, that is to say, that when naphthylamine and diazotized aniline are used, the fruit may be contacted with the naphthylamine either before or after being brought into contact with the diazotized aniline. When using naphthylamine, it is recommended that about 25 grams thereof be used with 1000 cc. of 0.25 normal nitric acid.

In view of the fact that relatively high concentrations of the intermediates may be employed in the treating baths, very short times of contact may be employed. For example, the average time of contact of the fruit with a bath of intermediates need not exceed ½ minute and shorter times often suffice. These short times of contact do not impair the keeping qualities of the fruit and as a result, withering or shrinkage of the treated fruit upon storage is not accelerated. In view of the sterilizing effect obtained, it is not necessary to subject the fruit to the action of a separate bath containing mold-inhibiting or mold-retarding ingredients. As the treatment may be (and preferably is) carried out at relatively low atmospheric temperatures, the cost of equipment is reduced and the process does not necessitate the careful control which characterized some of the prior methods. A relatively small treating unit is capable of handling extremely large quantities of fruit.

It will be seen, therefore, that a simple and very effective method of treating fruit has been provided, such method simultaneously enhancing the varietal color of the fruit and sterilizing the fruit so that the development of decay caused by the various types of molds and fungi is effectively prevented. Moreover, the process is capable of being used at normal atmospheric temperatures and preferably at temperatures below 100° F. with concentrated treating agents so that the size of the installments and cost thereof is kept at a minimum. Although particular couplings of intermediates have been disclosed, other dye intermediates capable of reacting with one another in such manner as to produce a dye of the desired shade or tone, may be used. Generally stated, diazotized intermediates, beta naphthol and beta naphthylamine are the preferred intermediates for use in this process.

All such changes and modifications as come within the scope of the appended claims are embraced thereby.

I claim:

1. In a method of enhancing the varietal color of whole fruit and simultaneously protecting said fruit from decay, the steps of contacting whole fruit with a diazotized intermediate, removing fruit from such contact, and then contacting the fruit with a bath containing beta naphthol whereby an enhanced varietal color is imparted to substantially the entire surface area of the fruit.

2. In a method of enhancing the varietal color of whole fruit and simultaneously protecting said fruit from decay, the steps of contacting whole fruit with a diazotized intermediate, removing fruit from such contact, then contacting the fruit with a bath containing beta naphthylamine, and then rinsing the fruit whereby an enhanced varietal color is imparted to substantially the entire surface area of the fruit.

3. In a method of enhancing the varietal color of whole citrus fruit and simultaneously protecting said fruit from decay, the steps of contacting whole citrus fruit with a diazotized intermediate, removing fruit from such contact, and then contacting the fruit with another intermediate adapted to react with the diazotized intermediate to form a desired dye throughout the surface area of the fruit whereby the varietal color of the fruit is enhanced, said contacting being carried out at normal fruit-treating temperatures.

4. In a method of enhancing the varietal color of whole fruit, the steps of contacting whole fruit with a diazotized intermediate for a period of time sufficient to cause said intermediate to penetrate into the peel of the fruit, removing fruit from such contact, and then contacting the fruit with another intermediate adapted to react with the diazotized intermediate to form a desired dye throughout the surface area of the fruit whereby the varietal color of the fruit is enhanced.

5. In a method of enhancing the varietal color of whole fruit, the steps of contacting whole fruit with a diazotized intermediate for a period of time sufficient to cause said intermediate to penetrate into the peel of the fruit, removing fruit from such contact, then contacting the fruit with another intermediate adapted to react with the diazotized intermediate to form a desired dye throughout the surface area of the fruit whereby the varietal color of the fruit is enhanced, and then subjecting the fruit to cleaning and waxing operations.

6. In a method of enhancing the varietal color of whole citrus fruit, the steps of contacting whole citrus fruit with one intermediate, removing fruit from such contact, and then contacting the fruit with another intermediate, one of said intermediates being of the diazotized type and the other being adapted to react with the diazotized type to form a dye throughout the surface of the fruit whereby the varietal color of the fruit is enhanced.

7. In a method of enhancing the varietal color of whole citrus fruit, the steps of contacting whole citrus fruit with a diazotized intermediate, removing fruit from such contact, and then contacting the fruit with a bath containing a mixture of naphthol and phenol whereby an enhanced varietal color is imparted to substantially the entire surface area of the fruit.

8. In a method of enhancing the varietal color of whole citrus fruit, the steps of contacting whole citrus fruit with beta naphthol, removing fruit from such contact, and then contacting the fruit with a bath containing diazotized xylidine whereby a dye substance adapted to enhance the varietal color of fruit is formed over the entire surface area of the fruit.

JAGAN N. SHARMA.